United States Patent

Prothro

[11] Patent Number: 5,944,595
[45] Date of Patent: Aug. 31, 1999

[54] FEATHER PICKING DEVICE

[76] Inventor: Glenn J. Prothro, 2665 Hwy. 1183, Simmesport, La. 71369

[21] Appl. No.: 09/195,026
[22] Filed: Nov. 18, 1998
[51] Int. Cl.⁶ .................................................. A22C 21/02
[52] U.S. Cl. ............................................... 452/88; 452/92
[58] Field of Search ................................ 452/88, 87, 91, 452/92, 86

[56] References Cited

U.S. PATENT DOCUMENTS

| 2,599,621 | 6/1952 | Fisher . | |
|---|---|---|---|
| 2,607,072 | 8/1952 | Johnson . | |
| 2,683,282 | 7/1954 | McKinley et al. . | |
| 2,834,982 | 5/1958 | Toti . | |
| 4,174,551 | 11/1979 | McKendree . | |
| 4,199,842 | 4/1980 | Bergeron | 452/92 |
| 4,288,888 | 9/1981 | Herolzer | 452/92 |
| 4,330,903 | 5/1982 | Vilotti . | |

FOREIGN PATENT DOCUMENTS

| 44901 | 1/1949 | Australia | 452/88 |
|---|---|---|---|
| 453948 | 1/1949 | Canada | 452/88 |
| 1152452 | 2/1958 | France | 452/88 |
| 324150 | 10/1957 | Switzerland | 452/88 |
| 741977 | 12/1955 | United Kingdom | 452/87 |

Primary Examiner—Willis Little
Attorney, Agent, or Firm—Joseph N. Breaux

[57] ABSTRACT

A feather picking device which includes an electric motor with two output shafts wherein each of the output shafts is used to mount a feather picking spool. The spools include a series of rubber bands connected in rows and are provided with rubber bands of a certain size to match the needs of a particular bird. Smaller bands are provided for picking feathers from doves, quails, and other small birds while larger rubber bands are provided for picking feathers from geese and other larger birds. The motor is housed within a housing position over a narrow gage feather collection cage which is enclosed within an airflow housing. Air is drawn through the airflow housing and the feather collection cage by a fan mounted to the back thereof. The airflow housing and fan are supported on wheels so that the feather picking device can be easily moved.

6 Claims, 3 Drawing Sheets

FEATHER PICKING DEVICE

TECHNICAL FIELD

The present invention relates to devices and methods for feather pickers and more particularly to devices and methods for a feather picking device which comprises an electric motor with two shafts wherein each of the output shafts has a removable spool upon which a series of rubber bands are connected in rows. The spools are supplied with different sized rubber bands, such as smaller bands for picking feathers from small birds while the other spools with larger rubber bands for picking feathers from larger birds are also provided. The motor is housed within a housing position over a narrow gage cage enclosed within an airflow housing wherein the air is drawn through the housing by a fan. The cage collects the removed feather and is removable for easily disposing the feathers. The airflow housing and fan are supported on wheels for positioning the feather picker device in a desired location.

BACKGROUND ART

Numerous feather picking devices have been disclosed and patented for overcoming certain problems associated with picking feathers from birds. These devices have been designed to be utilized with birds of different size, for continuous flow of birds into a feather plucking system, and addressing the problem associated with scarring the bird's skin by the use of a feather picking device. Although the prior art inventions are extremely useful for their stated purposes they do not overcome the problem associated with providing a feather picking device which can be used on birds of all sizes with changeable spools and which collects feathers in a central collection basket and further which can be rolled and positioned in any location for use as desired. The prior art patents which are relevant are as follows:

Fisher, U.S. Pat. No. 2,599,621; Johnson, U.S. Pat. No. 2,607,072; McKinley, et al., U.S. Pat. No. 2,683,282; Toti, U.S. Pat. No. 2,834,982; McKendree, U.S. Pat. No. 4,174,551; Vilotti, U.S. Pat. No. 4,303,903.

As will be shown below in the detailed description, the present invention provides a useful feather picker which can be used on birds as small as a dove and on large birds such as geese. The invention accomplishes this by providing a dual shaft motor with feather picking spools mounted on each shaft and further wherein the feather picking spools are fitted with either a small or larger rubber bands depending upon the bird size. Additionally, the spools may be quickly exchanged for spools with different size rubber bands as desired. The present invention also has a feather collection cage which collects the feathers at the bottom of a housing which housing draws air around and through the feather collection cage so that the feathers can be disposed of easily by the user. The present invention also includes wheels mounted to the bottom of the housing allowing the feather picker to be easily moved from location to location as desired by the user.

GENERAL SUMMARY DISCUSSION OF INVENTION

It is thus an object of the invention to provide a feather picking device that is useable for larger and smaller birds and comprises a dual shaft motor with feather picking spools mounted on each shaft which are interchangeable depending upon the bird or feather size to be plucked.

It is a further object of the invention to provide a feather picking device that includes a feather collection cage which is mounted within a housing which draws air through and around the feather collection cage.

It is a still further object of the invention to provide a feather picking device that comprises an electric motor having two output shafts wherein each of the output shafts has a feather picking spool upon which a series of rubber bands are connected in rows. The spools are easily removed and replaced with spools of different rubber band sizes as desired. The motor is housed within a housing positioned over a feather collection cage which is enclosed within an airflow housing wherein air is drawn through the housing and around and through a feather collection cage by a fan and further wherein the housing is mounted on wheels so that the use may position the feather picking system in a desired location for use.

BRIEF DESCRIPTION OF DRAWINGS

For a further understanding of the nature and objects of the present, invention, reference should be had to the following detailed description, taken in conjunction with the accompanying drawings, in which like elements are given the same or analogous reference numbers and wherein.

EXEMPLARY MODE FOR CARRYING OUT THE INVENTION

It can be seen from the following description that in use, a person desiring to pick feathers from a bird would simply open the hinged top cover of the feather picking device, install the appropriate feather picking spool onto the dual shaft motor and place the control switch in the "on" position energizing the exhaust fan and the feather removing motor. The user may east y change the feather removal spools as desired depending upon the size of the bird which is being de-feathered. As the exhaust fan draws air through the opening of the device, the feathers are drawn into a feather collection cage. After the feather picking operation is completed, the user would then remove the removable hood housing, which includes the feather picking motor and lift out the feather collection cage and dispose of the feathers. The large capacity of the feather collection cage allows for numerous birds to be picked prior to dumping the collection cage. The use of the present device provides a very practical and easy to use method of allowing anyone who raises chickens or hunts game birds to clean them faster and easier without the hassle of having feathers flying all about. The wheels mounted to the bottom of the device allows the user to easily place the device in a desired location and easily store the device when not in use.

Figure 1:
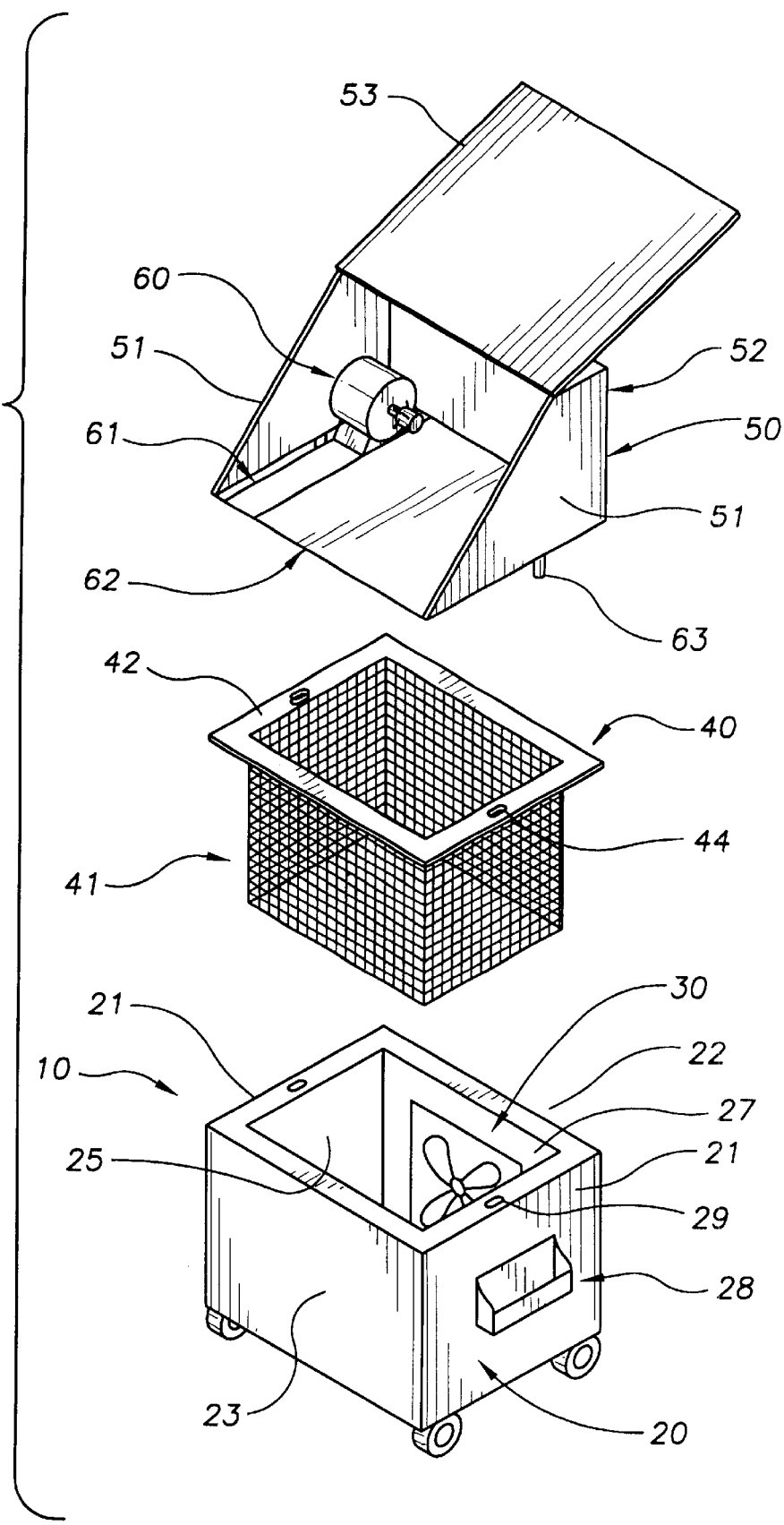
FIG. 1 is an isometric view of the feather picking device illustrating its component parts.
Figure 2:
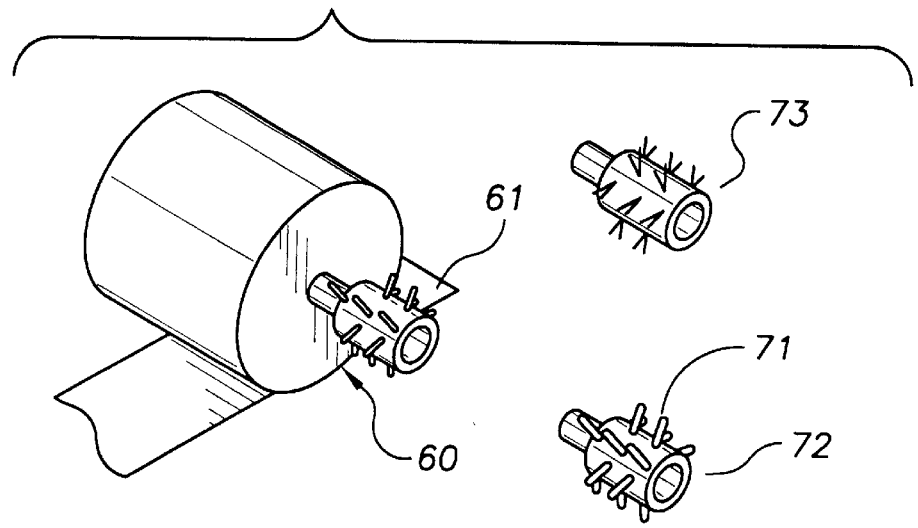
FIG. 2 is an isometric isolated view of the electric motor with feather picking spools with various sized rubber bands mounted thereto.

Referring to the figures in detail, FIG. 1 illustrates the main components of the feather picking device 10 which includes the air flow housing 20, exhaust fan 30, feather collection cage 40, removable hood housing 50, and feather removal motor 60.

The airflow housing 20 is preferably constructed in the dimension of a cube with a square open top and includes two upright side walls 21, a upright back wall 22, an upright front wall 23, and a bottom 24. The upright walls, and bottom are preferably constructed of plywood or galvanized sheet metal and connected together along their intersecting edges. A top edge of the side walls is used to mount a horizontal perimeter lip 24 which extends continuously around a perimeter and toward the interior 25 of the airflow housing. The horizontal perimeter lip 24 is used as a mounting means for the feather collection cage 40 and the hood housing 50. The exhaust fan 30 is mounted to the exterior of back upright wall 22 and preferably located centrally between the side edges of the back upright wall and near to the bottom edge of the back upright wall. The back upright wall includes an aperture 26 which extends through the back upright wall and provides an exit port for air which is exhausted from an interior 25 of the airflow housing 20. As the exhaust fan 30 is energized, air will enter the open top 27 of the airflow housing and enter the interior of an airflow housing and out the exhaust port 26.

The dimensions of the airflow housing are preferably about thirty four inches high for all the upright walls while the walls are about twenty five and a half inches long and wide and the exhaust fan opening is about 21 inches in diameter. The horizontal perimeter lip is preferably about one and a half inches to about two inches from the edge of the side walls to the interior edge of the perimeter lip. The airflow housing can also include handles mounted to an exterior of the side wall members 28 and four wheels mounted to an exterior bottom surface of the airflow housing so that the complete device can be rolled to locations as desired.

The feather collection cage 40 includes a cage portion 41 which is constructed of screen mesh material which allows for air to easily flow through said material while feathers removed from birds are not allowed to flow through the screen mesh. The inventor has found that screen mesh commonly known as "rat wire" is useful for the present invention because it provides sufficient rigidness while prohibiting the flow of feathers through the screen mesh material. The feather collection cage 40 includes a top mounting edge 42 which is dimensioned to fit on top of the horizontal perimeter lip 24 of the airflow housing 20. The purpose of the feather collection cage mounting edge and the horizontal perimeter lip is to provide a mounting means which provides a distance between an interior of the upright walls of the airflow housing and an exterior of the cage material on the feather collection cage so that air drawn through the airflow housing by the exhaust fan may easily circulate around the complete outside surface of the feather collection cage. This allows for feathers to be collected on the complete surface of the feather collection cage so that the feather collection cage can collect a maximum amount of feathers before it is required to be dumped. According-y, the feather collection cage screen material is dimensioned so that a space of about one and a half inches to two inches is provided between the mesh material and the interior of the upright walls and bottom member.

A removable hood housing 50 is illustrated in the drawings and is removable so that a user may easily pick the hood housing off gaining access to the removable feather collection cage. The hood housing 50 includes upright side walls 51, upright back portion 52 which extends up the back portion and over a portion of the top. A hinged cover 53 which when open provides access to the front of the device and when closed protects the device from rain and weather.

Figure 3:
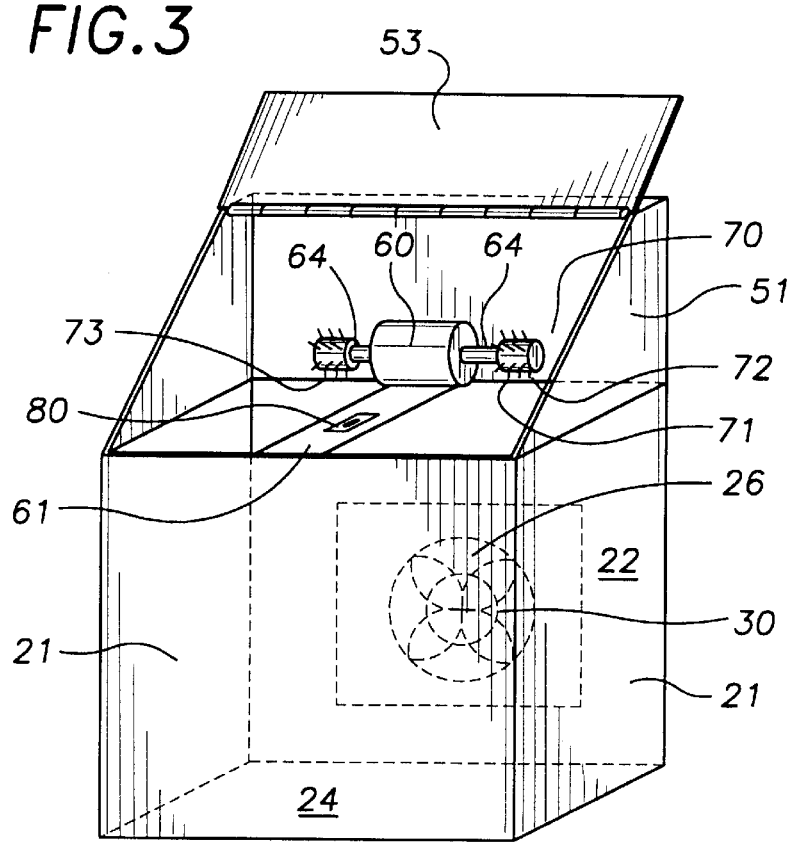
FIG. 3 is an isometric front view of the feather picking device illustrating the positioning of the exhaust fan and the dual shaft motor on the airflow housing.
Figure 4:
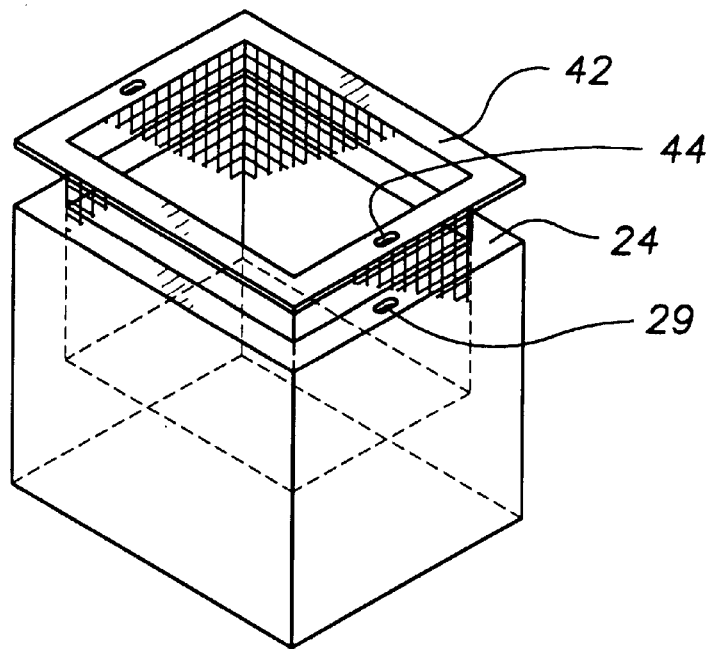
FIG. 4 is an isometric view of the airflow housing and feather collection cage of the feather picking device.
Figure 5:
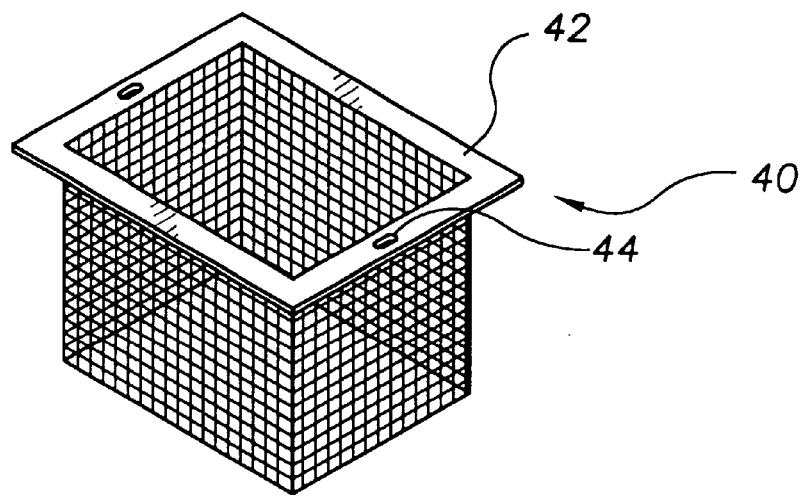
FIG. 5 is an isometric view of a feather collection cage of the device described herein.

The feather removal motor 60 is mounted to a narrow motor mount 61 which extends between the back upright wall 52 and a front extension mount 62. The front extension 62 extends between the side wall front bottom edges and provides a means for increasing the rigidity of the side walls and also for mounting the narrow motor mount. FIG. 1 illustrates the narrow motor mount pushed over to a left side of the hood housing. While FIG. 3 illustrates the motor mount centrally located between the upright side walls of the hood housing. The change of petitioning of the narrow motor mount is achievable because the narrow motor mount may be slid along the front extension mount 62 and repositioned on the back upright wall by altering the mounting screw locations thereon. A user may want to position a motor to the left as illustrated in FIG. 1 if larger birds are being de-feathered as additional space is required on the interior of the hood housing. Mount pins 63 extends from bottom edges of the upright side walls of the hood housing and are receivable through apertures 44 through the feather collection cage mounting edge and into apertures 29 on the horizontal perimeter lip of the airflow housing. These mounting pins 63 and the apertures provide a secure mounting means for the hood housing when it is placed on the airflow housing and also assures the positioning of the feather collection cage thereon.

The feather removal motor 60 includes a dual shaft 64 upon which feather removal spools 70 are mounted. The feather removal spools 71 are removable from the shaft ends by use of a set screw and each feather removal spool 70 includes numerous rubber bands 71 positioned on the outer surface of the spool and evenly spaced on the outer surface of the spool so that when the spool is rotated using the electric motor the rubber bands effectively removed feathers from a bird. Rubber bands of different size may be utilized for different sized birds. Spool 72 includes larger rubber bands to be used on geese and ducks while spool 73 includes smaller rubber bands so that the spool may be used to remove feathers from dove and quail and other small birds.

The feather removal motor 60 and the exhaust fan 30 are operated by a single on/off switch 80 which is preferably mounted in a convenient and waterproof area such as on the narrow motor mount 61 as illustrated in 63.

It is preferable that numerous feather removal spools 70 are provided with the device so that the user always has a spool available if rubber bands are inadvertently knocked off or removed and further spools with different size rubber bands so that a proper sized spool with rubber bands is used on a particular bird.

It is noted that the embodiment of the feather picking device described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A feather picking device comprising:

a) an air flow housing with two upright side walls, a back upright wall, a front upright wall, a bottom integrally connected to lower edges of the four walls, a top opening, a housing interior formed therein, and a horizontal perimeter lip extending continuous around a perimeter of a top edge of the four walls and extending perpendicular from a plane of the walls into the top opening a distance of about two inches, b) an exhaust fan mounted on an exterior surface of the back upright wall and positioned over an exhaust opening extending through the back upright wall and centrally located between side edges of the back upright wall and near a bottom edge, the exhaust opening and the exhaust fan are oriented so that when the fan is operating air is withdrawn from the housing interior through the exhaust opening, c) a feather collection cage constructed of screen mesh material so that air will flow through the cage material but removed feathers will not, the cage is dimensioned to fit into the housing interior with space between a cage material outer surface and housing side wall interior surfaces so that air that is free to move around all exterior surfaces of the collection cage, the collection cage includes a top opening with a rigid mounting ring that rest on the horizontal perimeter lip of the housing, d) a removable hood housing with two upright side walls, a back upright wall and top formed from a too portion of the back wall, a front opening providing access to an interior of the hood housing and the air flow housing, the upright walls are dimensioned so that bottom edges of the upright walls rest on the horizontal perimeter lip of the housing, a feather removing dual shaft motor mounted to a narrow motor mount which is centrally positioned between the two upright side walls and which mount extends longitudinally from the back upright wall to a front opening of the hood housing, the dual shaft feather removing motor is mounted with its shaft parallel to the air flow housing front upright panel, e) a feather remover spool releasable mountable to the shaft of the dual shaft feather remover motor, the spool has numerous rubber bands of the same size suitable for removing feathers from small birds and wherein the rubber bands are evenly spaced and extending from a spool outer surface, an additional feather remover spool releasable mountable to the other shaft of the dual shaft motor and includes rubber bands suitable for removing feathers from larger birds and wherein the rubber bands are evenly spaced and extending from a spool outer surface, and f) four wheels mounted to the bottom of the air flow housing so that the device can be rolled to a desired location for use.

2. The feather picking device of claim 1, wherein the numerous feather remover spools are provided each with rubber bands suitable for removing feathers from particular size birds.

3. The feather picking device of claim 1, wherein the hood housing further comprises a pair of retention pins extending from a bottom edge of the upright side walls and insertable into mounting apertures extending through the horizontal perimeter lip of the air flow housing.

4. The feather picking device of claim 1 wherein the device further comprises an on/off switch which activates both the feather removal motor and the exhaust fan.

5. The feather picking device of claim 1 wherein the hood housing further comprises a front extensions mount extending from a front bottom corner of each upright side wall of the hood housing and providing a front mounting location for the narrow motor mount and further providing rigidity to the upright side walls.

6. The feather picking device of claim 1 wherein the hood housing further comprises a hinges front cover which extends over the front open section of the hood housing when in a closed position and hinges open over the top and back of the hood housing when in the open position.

* * * * *